US011187777B2

(12) United States Patent
Fänge et al.

(10) Patent No.: US 11,187,777 B2
(45) Date of Patent: Nov. 30, 2021

(54) SYSTEMS, METHODS, AND DEVICES FOR VERIFICATION OF POSITION ESTIMATION USING AN ORIENTATION SENSOR

(71) Applicant: Sony Corporation, Tokyo (JP)

(72) Inventors: Thomas Fänge, Lund (SE); Mattias Falk, Lund (SE); Hannes Bergkvist, Lund (SE); Ivar Bergkvist, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 227 days.

(21) Appl. No.: 16/610,943

(22) PCT Filed: Jun. 20, 2017

(86) PCT No.: PCT/US2017/038231
§ 371 (c)(1),
(2) Date: Nov. 5, 2019

(87) PCT Pub. No.: WO2018/236343
PCT Pub. Date: Dec. 27, 2018

(65) Prior Publication Data
US 2020/0057134 A1    Feb. 20, 2020

(51) Int. Cl.
*G01S 5/02* (2010.01)
*B25J 9/16* (2006.01)
(Continued)

(52) U.S. Cl.
CPC ........... *G01S 5/0247* (2013.01); *B25J 9/1692* (2013.01); *G01S 5/0009* (2013.01); *G01S 5/021* (2013.01); *G01S 5/0284* (2013.01); *G01S 5/186* (2013.01)

(58) Field of Classification Search
CPC ...... G01S 5/0247; G01S 5/0009; G01S 5/021; G01S 5/0284; G01S 5/186; G01S 13/86;
(Continued)

(56) References Cited

U.S. PATENT DOCUMENTS

2008/0216552 A1* 9/2008 Ibach ................ G01B 11/002
73/1.01

FOREIGN PATENT DOCUMENTS

DE     102005000732 A1    7/2006
EP        2546674 A1    1/2013
(Continued)

OTHER PUBLICATIONS

Notification of Transmittal of the International Search Report and the Written Opinion of the International Searching Authority, or the Declaration, in corresponding PCT Application No. PCT/US2017/038231 (dated Mar. 16, 2018).

*Primary Examiner* — Shaima Q Aminzay
(74) *Attorney, Agent, or Firm* — Myers Bigel, P.A.

(57) ABSTRACT

A method of determining the location of the first object (10) may include receiving signals at a second object (20) from a plurality of measurement points (11) on the first object (10), estimating locations of the plurality of measurement points (11) on the first object (10), determining an estimate of a location of the first object (10), determining a first measurement of an orientation of the first object (10) based on the estimating of the locations of the plurality of measurement points (11) on the first object (10), and determining a second measurement of the orientation of the first object (10) based on measurements by an orientation sensor (12) on the first object (10). The method may include estimating an error of the estimate of the location of the first object (10) based on a difference between the first and second orientation measurements and adjusting a movement of the second object (20) based on the estimated error.

20 Claims, 9 Drawing Sheets

FIG. 1

(51) Int. Cl.
*G01S 5/00* (2006.01)
*G01S 5/18* (2006.01)

(58) Field of Classification Search
CPC .......... G01S 13/881; G01S 5/18; G01S 13/46; G01S 5/14; B25J 9/1692; B25J 13/089; G05B 2219/40597
USPC ........................................................ 700/258
See application file for complete search history.

(56) References Cited

FOREIGN PATENT DOCUMENTS

| | | |
|---|---|---|
| WO | 01/02874 A1 | 1/2001 |
| WO | 2005/108020 A1 | 11/2005 |
| WO | 2012/024434 A1 | 2/2012 |

* cited by examiner

SYSTEMS, METHODS, AND DEVICES FOR VERIFICATION OF POSITION ESTIMATION USING AN ORIENTATION SENSOR

CLAIM OF PRIORITY

The present application is a 35 U.S.C. § 371 national stage application of PCT Application No. PCT/US2017/038231, filed on Jun. 20, 2017, the entire content of which is incorporated by reference herein. The above-referenced PCT Application was published in the English language as International Publication No. WO 2018/236343 A1 on Dec. 27, 2018.

FIELD

Some embodiments of the inventive concepts relate generally to systems, methods, and devices for estimating the position and/or orientation of an object, and, more particularly, to systems, methods, and devices including verification of the position estimation.

BACKGROUND

In various fields, it is desirable to determine a position and/or orientation of an object in three-dimensional space. One example is the field of robotics, where a robot may need to perform operations in relation to such object, e.g., picking up the object. The position and/or orientation of the object may be determined within a coordinate system used by the robot for controlling its operations. Other applications may involve indoor or outdoor tracking of objects.

Methods for determining the position and/or orientation of an object may be limited by the accuracy of the technologies used to determine the position and/or orientation of the object. For example, an estimation of a position of an object may include an error. In the example of the field of robotics, an error in an estimation of a position of an object may result in a failure to perform the operations in relation to the object. A robot may damage itself and/or the object based on the error in the estimation of the position of the object. Improved determination of the position and/or orientation of an object may be desired, for example, for robots performing positioning operations on objects.

SUMMARY

According to some embodiments of the inventive concepts, methods of determining a location of a first object are provided. A method of determining the location of the first object may include receiving signals at a second object from a plurality of measurement points on the first object. The method may include estimating locations of the plurality of measurement points on the first object based on the signals received at the second object from the plurality of measurement points on the first object. The method may include determining an estimate of a location of the first object based on the estimating of the locations of the plurality of measurement points on the first object. The method may include determining a first measurement of an orientation of the first object based on the estimating of the locations of the plurality of measurement points on the first object. The method may include determining a second measurement of the orientation of the first object based on measurements by an orientation sensor on the first object. The method may include estimating an error of the estimate of the location of the first object based on a difference between the first measurement of the orientation of the first object and the second measurement of the orientation of the first object. The method may include adjusting a movement based on the error of the estimate of the location of the first object. In some embodiments, the adjusting of the movement may include adjusting a movement of the second object based on the error of the estimate of the location of the first object.

The signals may be emitted from the plurality of measurement points on the first object to the second object. The estimating of the locations of the plurality of measurement points may be based on a timing, an amplitude, and/or a phase of the signals received at the second object from the plurality of measurement points on the first object.

The method may include transmitting measurement signals from the second object to the plurality of measurement points on the first object. The signals received at the second object from the plurality of measurement points on the first object may include measurements of the measurement signals transmitted from the second object to the plurality of measurement points on the first object.

The signals received at the second object from the plurality of measurement points on the first object may include at least one of ultrasonic signals, radio signals, and radar signals.

The signals received at the second object from the plurality of measurement points on the first object may include first signals received at a first location of the second object from the plurality of measurement points on the first object and at least second signals received at an at least one second location of the second object from the plurality of measurement points on the first object.

The method may include moving the second object between the first location and the at least one second location in a time period between a time of receiving the first signals and a time of receiving the at least second signals.

Estimating the locations of the plurality of measurement points on the first object may include determining measurements of distances to each of the plurality of measurement points on the first object from a first location of the second object and from at least one second location of the second object and estimating the locations of the plurality of measurement points on the first object based on the measurements of the distances. Estimating the error of the estimate of the location of the first object may include estimating an error of the measurements of the distances based on a difference between the first measurement of the orientation of the first object and the second measurement of the orientation of the first object and estimating the error of the estimate of the location of the first object based on the error of the measurements of the distances.

A distance between adjacent ones of the plurality of measurement points on the first object may be greater than an accuracy of distance measurements of a technology used for the determining of the measurements of the distances.

The plurality of measurement points on the first object may include at least three measurement points on the first object that are arranged in two dimensions to define a plane.

The method may include aligning a reference feature of the first object with a reference feature of a device on the first object. The device may include the plurality of measurement points on the first object and the orientation sensor on the first object. Determining the location of the first object may be based on an arrangement of the plurality of measurement points in relation to the reference feature of the device. Determining the first measurement of the orientation of the first object is based on an arrangement of the plurality of measurement points in relation to the reference feature of the device.

Determining the second measurement of the orientation of the first object may be based on an arrangement of the orientation sensor in relation to the reference feature of the device.

The method may include determining that the estimate of the location of the first object is invalid based on the error of the estimate of the location of the first object being greater than a predetermined threshold.

The adjusting of the movement may include moving the second object closer to a target location based on the estimate of the location of the first object.

The method may include defining the target location based on the estimate of the location of the first object.

The method may include defining a boundary location based on the estimate of the location of the first object. The adjusting of the movement may include avoiding the boundary location.

The method may include adjusting the estimate of the location of the first object based on the difference between the first measurement of the orientation of the first object and the second measurement of the orientation of the first object.

According to some embodiments of the inventive concepts, systems are provided. A system may include a receiver configured to receive signals from a plurality of measurement points on an object and a control unit. The control unit may be configured to estimate locations of the plurality of measurement points on the object based on the signals received by the receiver from the plurality of measurement points on the object. The control unit may be configured to determine an estimate of a location of the object based on the estimating of the locations of the plurality of measurement points on the object. The control unit may be configured to determine a first measurement of an orientation of the object based on the estimating of the locations of the plurality of measurement points on the object. The control unit may be configured to determine a second measurement of the orientation of the object based on measurements by an orientation sensor on the object. The control unit may be configured to estimate an error of the estimate of the location of the object based on a difference between the first measurement of the orientation of the object and the second measurement of the orientation of the object. The control unit may be configured to adjust a movement of the system based on the error of the estimate of the location of the object. In some embodiments, the control unit may include a processor and the system may further include a non-volatile memory coupled to the processor. The non-volatile memory may include computer readable program code that, when executed by the processor, causes the processor to perform the described operations of the control unit.

The signals may include measurement signals that are emitted from the plurality of measurement points on the object to the system.

The control unit may be configured to transmit measurement signals from the system to the plurality of measurement points on the object. The signals received at the system from the plurality of measurement points on the object may include measurements of the measurement signals transmitted from the system to the plurality of measurement points on the object.

The signals received at the system from the plurality of measurement points on the object may include at least one of ultrasonic signals, radio signals, and radar signals.

The signals received at the system from the plurality of measurement points on the object may include first signals received at a first location of the system from the plurality of measurement points on the object and at least second signals received at an at least one second location of the system from the plurality of measurement points on the object.

The control unit may be configured to move the system between the first location and the at least one second location between receiving the first signals and receiving the at least second signals.

The control unit may be configured to estimate the locations of the plurality of measurement points on the object by being configured to determine measurements of distances to each of the plurality of measurement points on the object from a first location of the system and from at least one second location of the system and estimate the locations of the plurality of measurement points on the object based on the measurements of the distances. The control unit may be configured to estimate the error of the estimate of the location of the object by being configured to estimate an error of the measurements of the distances based on a difference between the first measurement of the orientation of the object and the second measurement of the orientation of the object and estimate the error of the estimate of the location of the object based on the error of the measurements of the distances.

A distance between adjacent ones of the plurality of measurement points on the object is greater than an accuracy of a technology used for the determining of the measurements of the distances.

The plurality of measurement points on the object may include at least three measurement points on the object that are arranged in two dimensions to define a plane.

The control unit may be further configured to determine that the estimate of the location of the object is invalid based on the error of the estimate of the location of the object being greater than a predetermined threshold.

The adjusting of the movement of the system may include moving at least a portion of the system closer to a target location based on the estimate of the location of the object.

The control unit may be further configured to define a boundary location based on the estimate of the location of the object. The adjusting of the movement of the system may include avoiding the boundary location.

The control unit may be further configured to adjust the estimate of the location of the object based on the difference between the first measurement of the orientation of the object and the second measurement of the orientation of the object.

According to some embodiments of the inventive concepts, devices are provided. A device may include at least three measurement points, an orientation sensor, and a control unit. The control unit may be configured to transmit a plurality of signals via the at least three measurement points to an object, receive measurements from the orientation sensor, and transmit the measurements to the object. In some embodiments, the control unit may include a processor and the device may further include a non-volatile memory coupled to the processor. The non-volatile memory may include computer readable program code that, when executed by the processor, causes the processor to perform the described operations of the control unit.

The plurality of measurement points may include at least three measurement points that are arranged on the beacon in two dimensions to define a plane.

According to some embodiments of the inventive concepts, systems are provided. A system may include a receiver configured to receive signals from a plurality of measurement points on an object. The system may include a first estimating circuit configured to estimate locations of the plurality of measurement points on the object based on the signals received by the receiver from the plurality of measurement points on the object. The system may include a first determining circuit configured to determine an estimate of a location of the object based on the estimating of the locations of the plurality of measurement points on the object. The system may include a second determining circuit configured to determine a first measurement of an orientation of the object based on the estimating of the locations of the plurality of measurement points on the object. The system may include a third determining circuit configured to determine a second measurement of the orientation of the object based on measurements by an orientation sensor on the object. The system may include a second estimating circuit configured to estimate an error of the estimate of the location of the object based on a difference between the first measurement of the orientation of the object and the second measurement of the orientation of the object. The system may include an adjusting circuit configured to adjust a movement of the system based on the error of the estimate of the location of the object. In some embodiments, one or more of the circuits may be implemented in hardware, software, or any combination thereof. For example, one or more of the circuits may include a processor and a non-volatile memory coupled to the processor. The non-volatile memory may include computer readable program code that, when executed by the processor, causes the processor to perform the described operations of the one or more of the circuits.

It is noted that aspects of the inventive concepts described with respect to one embodiment, may be incorporated in a different embodiment although not specifically described relative thereto. That is, all embodiments and/or features of any embodiment can be combined in any way and/or combination. These and other aspects of the inventive concepts are described in detail in the specification set forth below.

BRIEF DESCRIPTION OF THE DRAWINGS

The inventive concepts will become more apparent in view of the detailed description and the accompanying drawings.

DETAILED DESCRIPTION OF THE EMBODIMENTS

Figure 1:
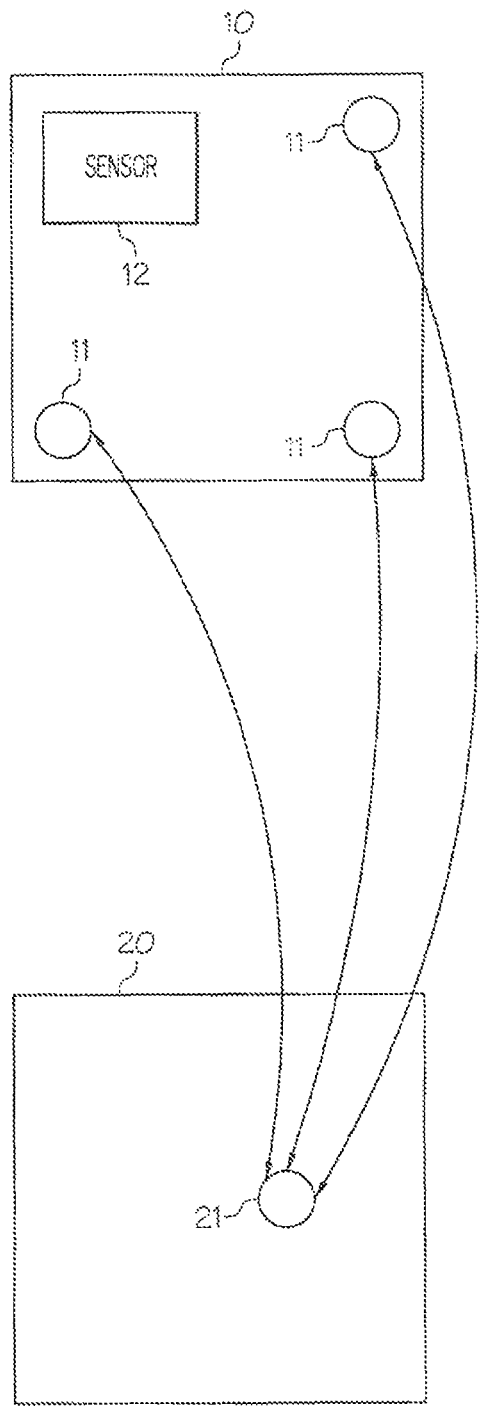
FIG. 1 is a block diagram illustrating a system for estimating the position and/or orientation of an object according to some embodiments of the inventive concepts.

The inventive concepts will be described more fully hereinafter with reference to the accompanying drawings, in which some embodiments are shown. The inventive concepts and methods of achieving them will be apparent from the following embodiments that will be described in more detail with reference to the accompanying drawings. The embodiments of the inventive concepts may, however, be embodied in different forms and should not be constructed as limited to the embodiments set forth herein. Rather, these embodiments are provided so that this disclosure will be thorough and complete, and will fully convey the scope of the inventive concepts to those skilled in the art.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of inventive concepts. As used herein, the term "and/or" includes any and all combinations of one or more of the associated listed items.

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the inventive concepts belong. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Some embodiments may be described with reference to illustrations that include elements that are similar to or the same as like elements that are previously described with respect to previous illustrations. Reference numerals the same as or similar to those described with respect to the figures may represent the same or similar elements, and descriptions thereof may be omitted or briefly described in the description in order to simplify the description.

In robotics, a robot may need to perform operations in relation to picking up, moving, and/or positioning an object. For such operations, precise control of the robot is essential to properly control the operations. However, determining the position and/or orientation of an object with a high degree of accuracy may be challenging. Various embodiments described herein may arise from the recognition that improved methods for determining the position and/or orientation of an object are needed to reduce mishandling and/or damage of an object by a robot. Specifically, solutions to perform accurate position and/or orientation determination based on measurement of various location points on an object along with compensation of measurement errors based on location measurements in conjunction with orientation measurements will be discussed in detail. Compensation of measurement errors based on location measurements and orientation measures may substantially improve the determination of the position and/or orientation of an object and thus improve performance of operations by a robot.

Some embodiments of the inventive concepts may be described herein where position and/or orientation of an object are determined to be used for controlling operation of a robot, e.g., an industrial robot to be used for manufacturing, packaging, or otherwise processing of a product. For example, the object could be a box, and the robot could be operable to pick up a part and put it into the box and/or to pick up a part from the box. However, embodiments of the inventive concepts are not limited thereto. For example, some embodiments may relate to various other applications, such as, for example, indoor or outdoor tracking of an object or virtual reality applications.

When estimating position and/or orientation of an object, it may be desirable to verify the accuracy of the estimations of the position and/or orientation. For example, with respect to a robot that is operable to pick up a part and put it into a box, an error in an estimation of a position and/or orientation of the box may cause the robot to place the part in the wrong location which, in some examples, may cause damage to one or more of the part, the robot, and the box. However, some methods of estimating position and/or orientation do not provide verification of the accuracy of the estimations of the position and/or orientation. Accordingly, embodiments of the inventive concepts provide improved systems, methods, and devices for estimating the position and/or orientation of an object including verification of the position estimation.

FIG. 1 is a block diagram illustrating a system for estimating the position and/or orientation of an object according to some embodiments of the inventive concepts. Referring to FIG. 1, a first object 10 may include a plurality of measurement points 11 and an orientation sensor 12. The plurality of measurement points 11 may be configured to transmit and/or receive signals. For example, the plurality of measurement points 11 may be configured to transmit and/or receive ultrasonic signals, radio signals, and/or radar signals. The orientation sensor 12 may be configured to measure an orientation of the first object 10. For example, the orientation sensor 12 may include one or more accelerometers and/or gyroscopic sensors. A second object 20 may have an interface 21 that is configured to transmit the signals to and/or receive the signals from the plurality of measurement points 11 on the first object 10. For example, the interface 21 of the second object 20 may be a receiver that is configured to transmit and/or receive the ultrasonic signals, radio signals, and/or radar signals.

A distance between adjacent ones of the plurality of measurement points 11 on the first object 10 may be greater than an accuracy of a technology used for the determining of the measurements of the distances. Measurements based on a technology, such as ultrasonic signals, radio signals, and/or radar signals, that is used to estimate the locations of the measurement points 11 on the first object 10 may be limited by an accuracy of the technology. For example, a technology may provide measurements that are accurate within a first distance D1. The plurality of measurement points 11 may be located on the first object 10 at least a second distance D2 apart from each other. If the second distance D2 between the measurement points 11 is less than the first distance D1 of the accuracy of the technology for measuring the signals, an error caused by the accuracy of the technology for measuring the signals may dwarf an estimate of the position and/or orientation of the first object 10. For example, two of the plurality of measurement points 11 that are the second distance D2 apart from each other may be measured as being in the same location or even on opposite sides of one another based on measurement points 11 being closer together than the accuracy of the technology for measuring the signals. Accordingly, the second distance D2 may be greater than the first distance D1. The plurality of measurement points 11 on the first object 10 may include at least three measurement points 11 that are arranged on the first object 10 in two dimensions to define a plane.

Each of the plurality of measurement points 11 on the first object 10 may define a corresponding position in a coordinate system (x, y, z) of the second object 20. From information concerning the arrangement of the measurement points 11 on the first object 10, the second object 20 may then calculate the position and/or orientation of the first object 10 in the coordinate system of the second object 20. The position and/or orientation of the first object 10 may then be used for controlling an operation, for example a movement, of the second object 20.

In some embodiments, the position and/or orientation of the first object 10 may be estimated using signals that are transmitted between the measurements points 11 on the first object 10 and the interface 21 of the second object 20. From each of the measurement points 11, the first object 10 may transmit a signal, which is received by the second object 20. On the basis of the received signals, the second object 20 may determine the position of each measurement point 11 in the coordinate system of the second object 20. For example, the positions of the measurement points 11 may be determined using run-time based distance measurements, triangulation calculations, and/or trilateration calculations. In some embodiments, for each of the measurement points 11, multiple measurements may need to be performed in order to estimate the position of the measurement point 11. In some embodiments, the multiple measurements may be determined with the second object 20 being placed in different positions, for example by movement of the second object 20. Moving the second object 20 into different positions to determine multiple measurements may enable a high accuracy without requiring an excessive size of the second object 20. In some embodiments, the interface 21 of the second object 20 may include multiple receivers and/or multiple antennas to enable multiple measurements from different locations of the second object 20 without moving the second object 20.

In some embodiments, the second object 20 may determine distances between each of the measurements points 11 on the first object 10 and the interface 21 of the second object 20. These distances may be determined for each of a plurality of locations of the second object 20. For example, the second object 20 may determine distances between each of the measurements points 11 on the first object 10 and the interface 21 at a first location of the second object 20. Then the second object may be moved to at least one second location and the second object 20 may further determine distances between each of the measurements points 11 on the first object 10 and the interface 21 at the at least one second location of the second object 20. In some embodiments, the first location and the at least one second location of the second object 20 may include at least three locations. In some embodiments, the interface 21 of the second object 20 may include multiple receivers and/or multiple antennas at different locations on the second object to enable the distance measurements from different locations of the second object 20 without moving the second object 20. The second object 20 may deter mine the locations of each of the measurement points 11 on the first object 10 based on the distance measurements from the plurality of the locations of the second object 20. The locations may be measured based on the coordinate system of the second object 20.

Based on a known arrangement of the measurement points 11 in relation to the first object 10, the second object 20 may determine the position and/or orientation of the first object 10 in the coordinate system of the second object 20. In some embodiments, the second object 20 may receive the signals from the plurality of measurement points 11 on the first object 10, estimate the locations of the plurality of measurement points 11 on the first object 10 based on the signals received at the second object 20 from the plurality of measurement points 11 on the first object 10, determine an estimate of a location of the first object 10 based on the estimating of the locations of the plurality of measurement points 11 on the first object 10, and determine a first measurement of an orientation of the first object 10 based on the estimating of the locations of the plurality of measurement points 11 on the first object 10.

A second measurement of the orientation of the first object 10 may be determined based on measurements by the orientation sensor 12 of the first object 10. For example, in some embodiments, the second object 20 may determine the second measurement of the orientation of the first object 10 based on signals received from the first object 10 that include the measurements from the orientation sensor 12. As opposed to the first measurement of the orientation of the first object 10, which is based on measured locations of the plurality of measurement points 11 on the first object 10, the second measurement of the orientation of the first object 10 may be based on physical properties, such as gravity. Accordingly, an error in the measured locations of the plurality of measurement points 11 may not affect the second measurement of the orientation of the first object 10. The second measurement of the orientation of the first object 10 may be based on an arrangement of the orientation sensor 12 in relation to the first object 10.

The second measurement of the orientation of the first object 10 that is based on the measurements by the orientation sensor 12 of the first object may be compared to the first measurement of the orientation of the first object 10 that is based on the measured locations of the plurality of measurement points 11 to determine a difference between the first measurement of the orientation of the first object 10 and the second measurement of the orientation of the first object 10. The difference between the first and second measurements of the orientation of the first object 10 may indicate an error in the estimating of the locations of the plurality of location points 11 on the first object 10. The error in the estimating of the locations of the plurality of location points 11 on the first object 10 may be based on an error in the measuring of the distances between the measurements points 11 on the first object 10 and the interface 21 of the second object 20. An error of the estimate of the location of the first object 10 may be estimated based on the difference between the first measurement of the orientation of the first object 10 and the second measurement of the orientation of the first object 10.

In some embodiments, the error of the estimate of the location of the first object 10 may be compared to a predetermined threshold value. The estimate of the location of the first object 10 may be considered invalid when the error of the estimate of the location of the first object 10 is greater than a predetermined threshold.

The error of the estimate of the location of the first object 10 may be used to adjust a movement. For example, the error of the estimate of the location of the first object 10 may be used to adjust a movement of the second object 20. However, embodiments are not limited thereto and, in some embodiments, the estimate of the location of the first object 10 may be used to adjust a movement of an object other than the second object 20, such as a third object. In some embodiments, the second object 20 may be moved closer to a target location based on the estimate of the location of the first object 10. The target location may be defined based on the estimate of the location of the first object 10. The second object 20 may be moved closer to the target location when the error of the estimate of the location of the first object 10 is less than the predetermined threshold. The target location may be adjusted based on the error of the estimate of the location of the first object 10.

In some embodiments, the adjusting of the movement of the second object may include avoiding a boundary location based on the error of the estimate of the location of the first object 10. The boundary location may be defined based on the estimate of the location of the first object 10. The boundary location may be adjusted based on the error of the estimate of the location of the first object 10.

In some embodiments, the estimate of the location of the first object 10 may be adjusted based on the difference between the first measurement of the orientation of the first object 10 and the second measurement of the orientation of the first object 10. In other words, the estimate of the location of the first object 10 may be adjusted to compensate for the error of the estimate of the location of the first object 10.

Figure 2:
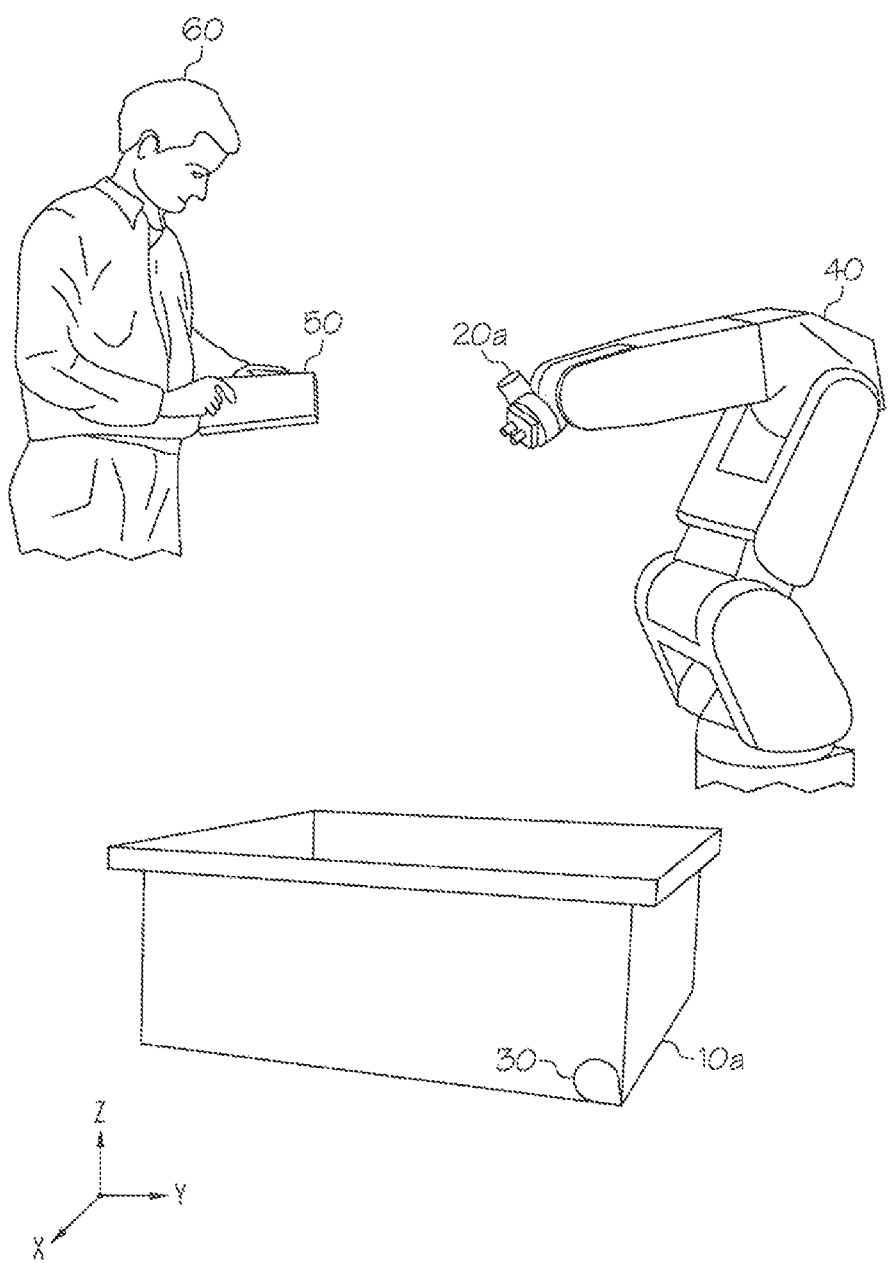
FIG. 2 is a perspective view of a system for estimating the position and/or orientation of an object according to some embodiments of the inventive concepts.

FIG. 2 is a perspective view of a system for estimating the position and/or orientation of an object according to some embodiments of the inventive concepts. Referring to FIG. 2, a beacon 30 may be attached to a box 10a. For example, the beacon 30 may be attached to the box 10a with a non-permanent magnet. However, embodiments of the inventive concepts are not limited thereto. For example, the beacon 30 could be provided with a non-permanent adhesive and/or a suction cup. The beacon 30 may be in a defined position and orientation on the box 10a. The defined position and orientation may be achieved by bringing a reference feature of the beacon 30 into alignment with a reference feature of the box 10a. A robot 40 may include a receiver unit 20a. For example, the receiver unit 20a may be on an arm of the robot 40. A controller 50 may be used for controlling operation of the robot 40, the beacon 30, and/or receiver unit 20a. FIG.

2 illustrates the controller 50 as handheld computer device, such as a tablet computer or smartphone. However, other types of controllers may be used as well, e.g., a stationary control terminal. In some embodiments, some or all of the operations of the controller 50 described herein may be performed by the robot 40, the receiver unit 20a, and/or the beacon 30. For example, some embodiments may not have a separate controller 50.

Using the controller 50, an operator 60 may instruct the system to measure signals transmitted from multiple measurement points of the beacon 30 to the receiver unit 20a. The measurement points of the beacon 30 may be the same as or similar to the measurement points 11 of the first object 10 of FIG. 1. Accordingly, a detailed description thereof may be omitted for brevity. In some embodiments, an application may be executed by the controller 50, i.e., through software installed on the controller 50, to control the transmission of the signals. Each of these measurement points may define a corresponding position in a coordinate system (x, y, z) of the robot 40. From information concerning the arrangement of the measurement points on the beacon 30 and in relation to the reference feature of the beacon 30, the receiver unit 20a and/or controller 50 may then calculate the position and orientation of the reference feature of the beacon 30, which due to the alignment also enables determination of the position and orientation of the reference feature of the box 10a in the coordinate system of the robot 40.

The beacon 30 may also include an orientation sensor, which may be the same as or similar to the orientation sensor 12 of the The position and orientation of the box 10a may be determined according to the operations described above with respect to the first object 10 and the second object 20 of FIG. 1. Accordingly, a detailed description of the determination of the determination of the position and orientation of the box 10a may be omitted for brevity. The position and orientation of the box 10a may then be used for controlling operation, for example a movement, of the robot 40.

Figure 3:
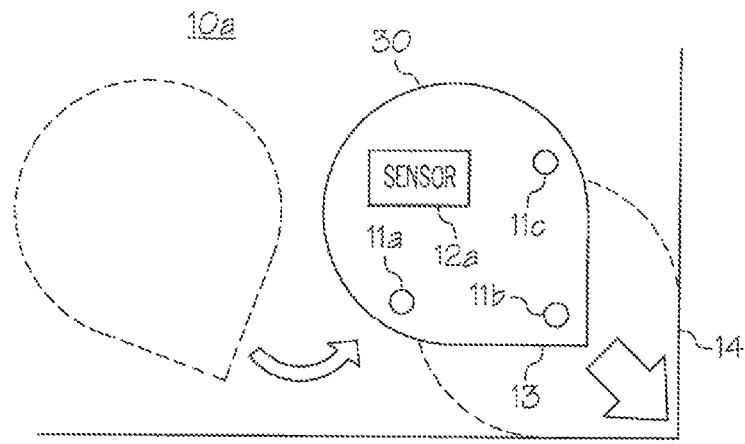
FIG. 3 is a block diagram of a device on an object according to some embodiments of the inventive concepts.

FIG. 3 is a block diagram of a device on an object according to some embodiments of the inventive concepts. Referring to FIG. 3, the reference feature of the beacon 30 may be a triangular shaped corner 13 formed by two linear outer edges of the beacon 30. The corner may have an angle of 90 degree, i.e., the edges forming the corner 13 may be perpendicular to each other. A remainder of the beacon 30 may be rounded. The reference feature on the box 10a may be an outer corner 14 of the box 10a. The beacon 30 is placed in such a way that the triangular shaped corner 13 points into the outer corner 14 of the box 10a and the edges of the corner are aligned with edges of the box 10a. This may involve that the operator 60 rotates and shifts the beacon 30 on an outer surface of the box 10a, until the corner 13 of the beacon 30 matches with the outer corner 14 of the box 10a. The alignment can be visually confirmed by the operator 60. Further, the operator 60 may use the outer edges of the beacon 30 and the tip of the corner 14 as a mechanical positioning aid. Accordingly, the beacon 30 can be easily placed and aligned in the desired position and orientation on the box 10a. The beacon 30, which is aligned in the desired position and orientation, may then be used for determining the position and orientation of the box 10a in the coordinate system of the robot 40. The beacon 30 may include multiple measurement points 11a, 11b, and 11c and may include an orientation sensor 12. The measurement points 11a, 11b, and 11c and the orientation sensor 12 of the beacon 30 may be the same as or similar to the measurement points 11 and the orientation sensor 12 of the first object 10 of FIG. 1. Accordingly, a detailed description thereof may be omitted for brevity. From each of the measurement points 11a, 11b, and 11c, the beacon 30 may transmit a signal, which may be received by the receiver unit 20a. Based on the received signals, the receiver unit 20a and/or the controller 50 may determine the position of each of the measurement points 11a, 11b, and 11c in the coordinate system of the robot 40, e.g., using run-time based distance measurements, triangulation calculations, and/or trilateration calculations for each of the measurement points 11a, 11b, and 11c, as described above with respect to the first object 10 and the second object 20 of FIG. 1. In some embodiments, for each of the measurement points 11a, 11b, and 11c, multiple measurements may be performed in order to estimate the position of the measurement points 11a, 11b, and 11c. In some embodiments, multiple measurements may be performed with the receiver unit 20a being placed in different positions (i.e., by movement of the robot 40). This has the benefit of enabling high accuracy without requiring excessive size of the receiver unit 20a. In some embodiments, the receiver unit 20a may include multiple receivers and/or multiple antennas so as to enable triangulation and/or trilateration already for a single position of the receiver unit 20a.

In some embodiments, the robot 40 may provide an instruction to the receiver unit 20a to get the positions of the measurement points. In some embodiments, this instruction may be sent by the controller 50. The measurement points 11a then send their signal. The measurement points 11a, 11b, and 11c may send their signals sequentially, according to a preconfigured order in a time-division multiplexing of the signals or may be multiplexed in other ways, e.g., frequency division multiplexing and/or code division multiplexing. In some embodiments, the sending of the signals may be controlled by the receiver unit 20a sending an instruction to the beacon 30 to start sending the signals and/or by the receiver unit 20a sending an instruction to the beacon 30 to stop sending the signals. The receiver unit 20a may receive the signals from the measurement points 11a, 11b, 11c and may calculate the distances between the receiver unit 20a and each of the measurement points 11a, 11b, 11c. In some embodiments, the calculation may be performed, for example, by the robot 40 and/or by the controller 50. In some embodiments, the distances may be calculated based on the timing, amplitude, and/or phase of the received signals.

Based on the known arrangement of the measurement points 11 in relation to the corner 13 and based on the alignment of the corner 13 with the corner 14, the receiver unit 20a and/or the controller 50 may determine the position and orientation of the corner 14 in the coordinate system of the robot 40. The receiver unit 20a and/or the controller 50 may for example store a management data set which defines an arrangement of the measurement points 11a, 11b, and 11c in relation to the corner 13 or in relation to the corner 14, when it is aligned with the corner 13. This management data set may be preconfigured or may be selected by the operator 60. Further, this management data set could also be selected automatically depending on a signal or indicator transmitted by the beacon 30.

The position of the corner 14, i.e., the point where the two edges forming the corner 14 meet, may form an origin of a local coordinate system of the box 10a, with axes of this local coordinate system of the box 10a being defined by the edges of the corner 14 and the direction perpendicular to these edges. Similarly, the position of the corner 13, i.e., the point where the two edges forming the corner 13 meet, may form an origin of a local coordinate system of the beacon 30, with axes of this local coordinate system of the beacon 30 being defined by the edges forming the corner 13 of the beacon 30 and the direction perpendicular to these edges. A rule for transformation between the coordinate system of the robot 40 and the local coordinate system of the box 10a and/or the local coordinate system of the beacon 30 may be determined on the basis of the measured positions of the measurement points 11 and the known arrangement of the measurement points 11 in relation to the corner 13. For example, the receiver unit 20a and/or the controller 50 could determine a transformation matrix implementing this transformation rule. The transformation rule may, for example, be used for moving the robot 40 to a certain position defined in the local coordinate system of the box 10a, e.g., with the aim of picking up an object from this position or placing an object in this position. A rule for transformation between the local coordinate system of the beacon 30 and the local coordinate system of the box 10a may be determined on the basis of the known geometry defined by the alignment of the reference features. In some cases, the alignment of the reference features may also cause full alignment of the local coordinate system of the beacon 30 and the local coordinate system of the box 10a. In other scenarios, the alignment of the reference features may indicate that the local coordinate system of the beacon 30 and the local coordinate system of the box 10a relate to each other by a known transformation, which may include a rotation and/or a translation.

The illustrated concepts may be applied to various other scenarios where determination of the position and orientation of an object is desired. For example, the beacon 30 could be used for tracking and controlling the position and orientation of a work object in real-time, as it is processed by the robot 40. For this purpose, the beacon 30 may be attached to the work object. If the position or orientation of the work object varies, the corresponding position and orientation defined in the coordinate system of the robot 40 can be updated accordingly.

Further, in some embodiments, the beacon 30 may have a different number measurement points. For example, a simplified version of the beacon 30 could provide only two measurement points 11a and 11b, which could be used for calculating a two-dimensional orientation of the box 10a (e.g., an orientation within the x-y-plane). In some embodiments, multiple beacons 10 may also be placed on multiple reference features of the box 10a, e.g., to define different corners of the box 10a.

Configuring and administrating metadata associated with the beacon 30, e.g., data representing the arrangement of the measurement points 11 in relation to the reference feature of the beacon 30, may be accomplished using a software application running on the controller 50. This software application may also guide the operator 60 with respect to the placement of the beacon 30 on the object. This may for example help to resolve ambiguities concerning the correct placement of the beacon 30 on the object. For example, the object could have multiple reference features which are each suitable for alignment of the beacon 30. Referring to FIGS. 2 and 3, the box 10a may have multiple outer corners which are each in principle suitable for alignment of the beacon 30. Guidance for the operator 60 may then for example involve showing a graphical representation of the box 10a to the operator 60 and indicating the target position of the beacon 30 in this graphical representation. In some embodiments, the reference feature of the beacon 30 and the reference feature of the box 10a may be configured in such a way that there is only one possibility of achieving correct alignment of the reference feature of the beacon 30 and the reference feature of the box 10a. For example, this could be achieved by providing the reference feature of the beacon 30 and the reference feature of the box 10a with unique key structures matching each other. The placement and alignment of the beacon 30 using matching reference features on the beacon 30 and the object may provide intuitive and precise determination of the position and orientation of the object.

Figure 4:
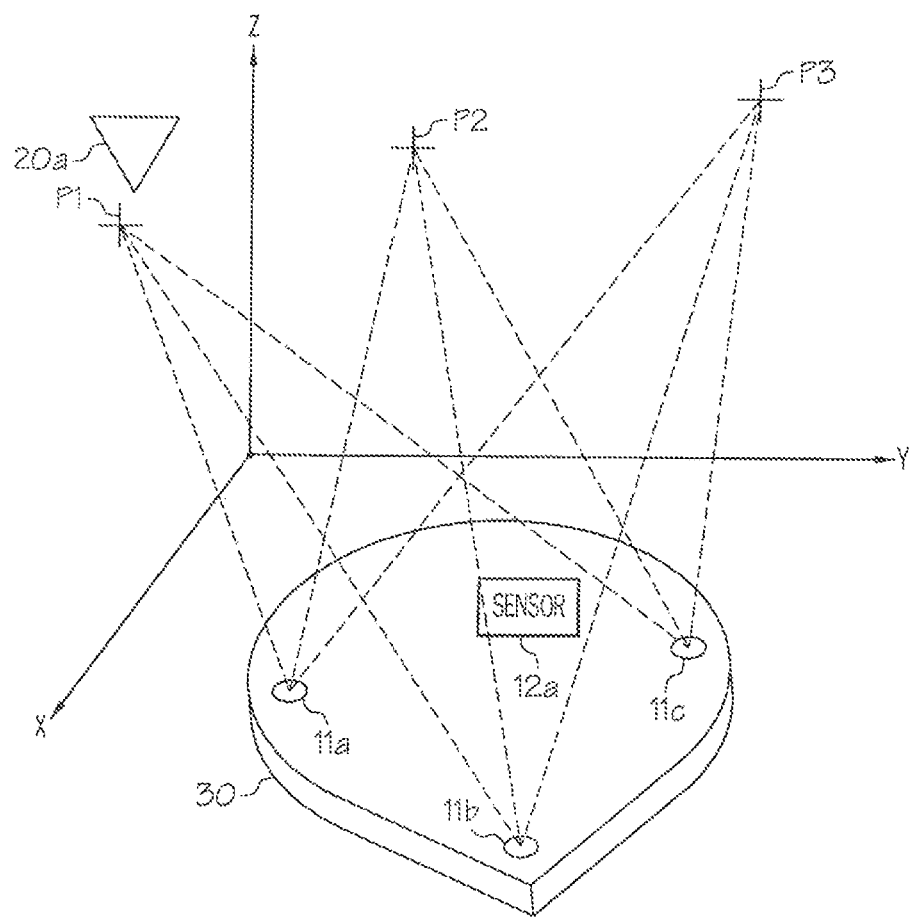
FIG. 4 is a perspective view conceptually illustrating intermediate operations of methods of estimating the position and/or orientation of an object according to some embodiments of the inventive concepts.

FIG. 4 is a perspective view conceptually illustrating intermediate operations of methods of estimating the position and/or orientation of an object according to some embodiments of the inventive concepts. Referring to FIG. 4, the measurement points 11a, 11b, and 11c may be spaced apart from each other on an upper surface of the beacon 30. The beacon 30 may transmit signals from each of the measurement points 11a, 11b, and 11c to the receiver unit 20a of the robot 40 at a first location P1. The beacon 30 may transmit signals from each of the measurement points 11a, 11b, and 11c to the receiver unit 20a of the robot 40 at one or more second locations P2, P3. Accordingly, the positions of the measurement points 11a, 11b, and 11c may be determined in the coordinate system of the robot 40 according to operations similar to or the same as those described above with respect to FIGS. 1-3 and detailed description thereof may be omitted for brevity.

Figure 5A:
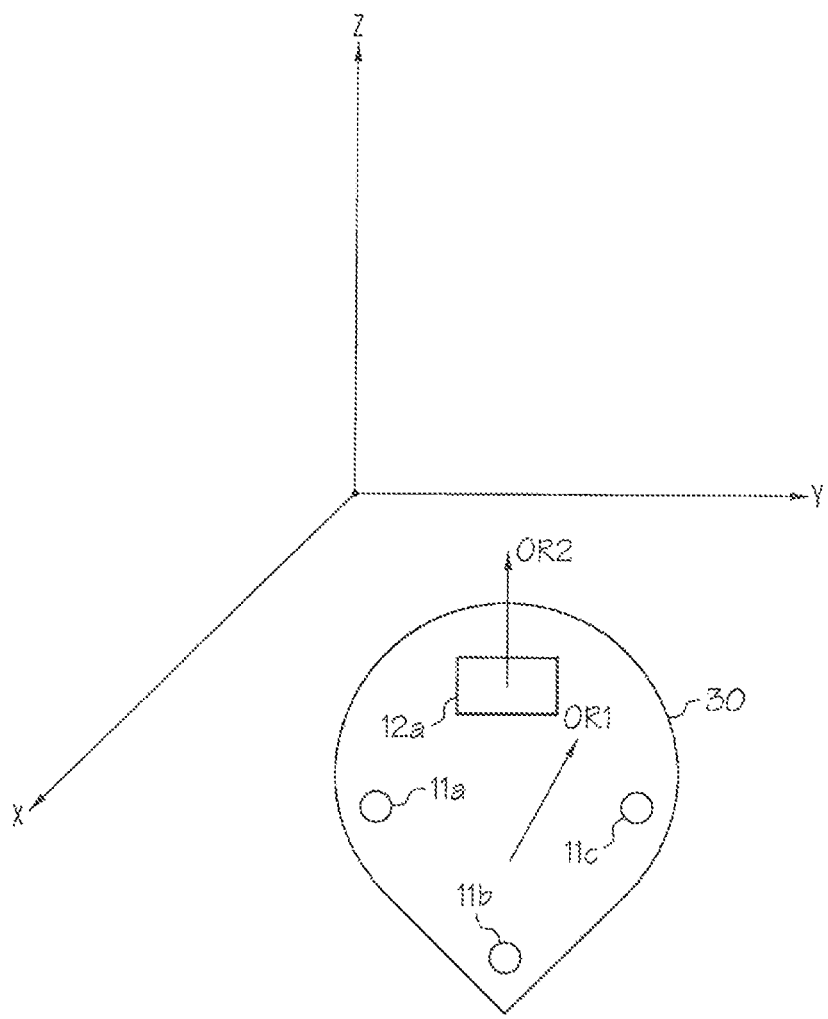
FIGS. 5A and 5B are perspective views conceptually illustrating a difference between first and second measurements of an orientation of an object according to some embodiments of the inventive concepts.
Figure 5B:
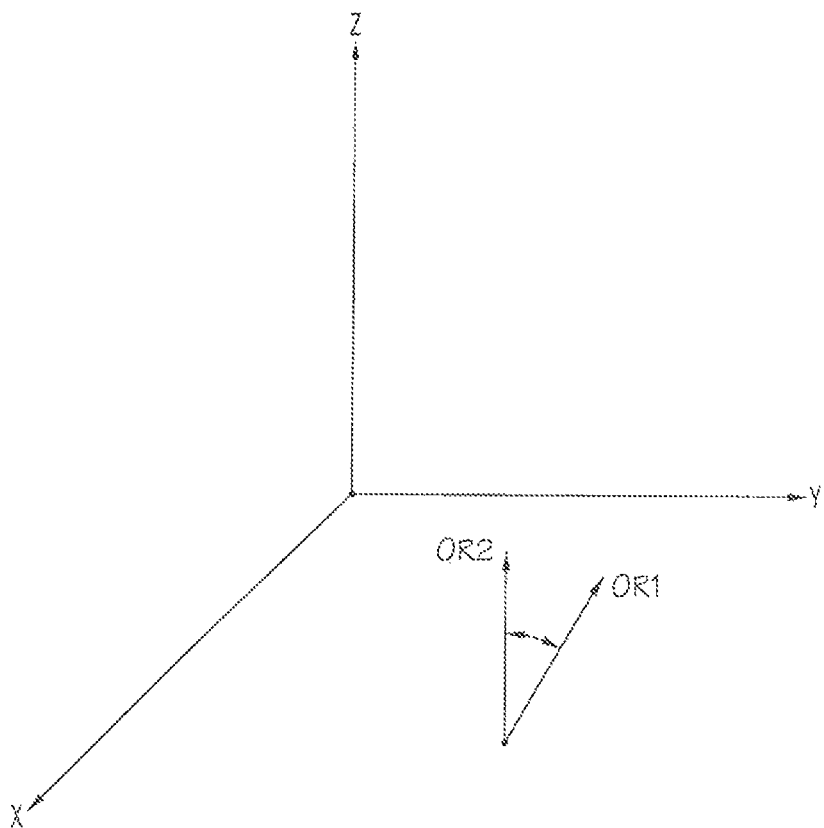

FIGS. 5A and 5B are perspective views conceptually illustrating a difference between first and second measurements of an orientation of an object according to some embodiments of the inventive concepts. Referring to FIGS. 1-5B, a position and a first orientation OR1 of the beacon 30 may be determined based on the measured positions of the measurement points 11a, 11b, and 11c based on the signals received from the measurement points 11a, 11b, and 11c. A second orientation OR2 of the beacon 30 may be determined based on measurements from the orientation sensor 12a. The first orientation OR1 and the second orientation OR2 may be determined according to operations that are the same as or similar to those described above with respect to FIGS. 1-4 and detailed descriptions thereof may be omitted accordingly for brevity.

While the first orientation OR1 and the second orientation OR2 are described with respect to the beacon 30, embodiments of the inventive concepts are not limited thereto and one or both of the first orientation OR1 and the second orientation OR2 may be orientations of the box 10a of FIG. 2 and/or the first object 10 of FIG. 1.

Moreover, while the signals are described as being transmitted by the beacon 30 via the measurement points 11a, 11b, and 11c, embodiments are not limited thereto. For example, in some embodiments, signals may be transmitted by the robot 40 via the receiver unit 20a, which may include a transmitter, and may be received at the measurement points 11a, 11b, and 11c to determine the locations of the measurement points 11a, 11b, and 11c. Accordingly, information about the signals received at the measurement points 11a, 11b, and 11c and/or information about the measurements from the orientation sensor 12a may be transmitted to the robot 40 and/or the controller 50 via one or more of the measurement points 11a, 11b, and 11c and/or via another communication interface.

While the determination of the locations and/or orientations are described as being performed by the robot 40 of FIG. 2, in some embodiments one or more of these determinations may be performed by the controller 50, the receiver unit 20a, the robot 40, the beacon 30, the orientation sensor 12a, and/or the box 10a.

Referring to FIGS. 5A and 5B, the first orientation OR1 may not be aligned with the second orientation OR2. In other words, there may be a difference between the orientation of the beacon 30 indicated by the first orientation OR1 that is based on the received signals and the orientation of the beacon 30 indicated by the second orientation OR2 that is based on the measurements from the orientation sensor OR2. The difference between the first orientation OR1 and the second orientation OR2 may be caused by an error in the determination of the first orientation OR1. The error in the determination of the first orientation OR1 may be caused by an error in the determination of the location of one or more of the measurement points 11a, 11b, and/or 11c. Because the estimate of the location of the box 10a is also based on the determination of the location of the measurement points 11a, 11b, and/or 11c, the error in the determination of the location of one or more of the measurement points 11a, 11b, and/or 11c may also cause an error in the estimate of the location of the box 10a. Accordingly, by comparing the first orientation OR1 and the second orientation OR2 to determine the difference between the first orientation OR1 and the second orientation OR2, a magnitude of the error of the estimate of the location of the box 10a may be estimated.

Figure 6:
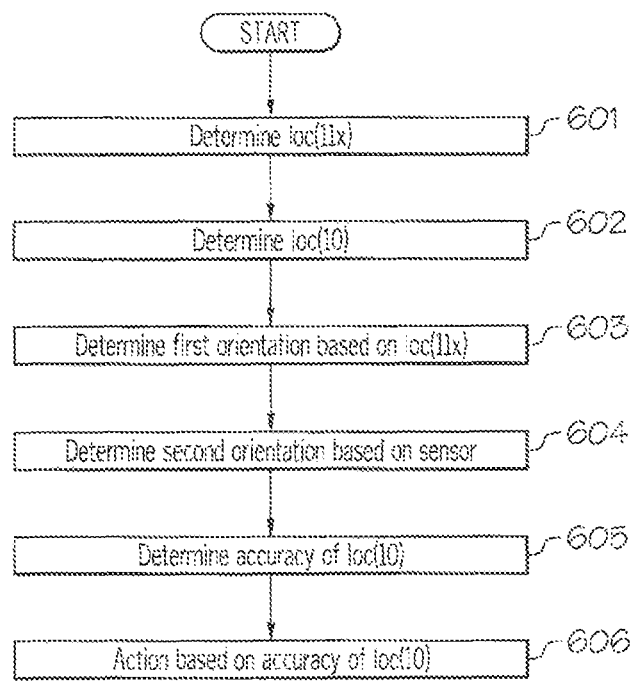
FIG. 6 is a flowchart illustrating operations of methods of estimating the position and/or orientation of an object according to some embodiments of the inventive concepts.

FIG. 6 is a flowchart illustrating operations of methods of estimating the position and/or orientation of an object according to some embodiments of the inventive concepts. While the operations of FIG. 6 will be described with reference to the box 10a and the robot 40 of FIG. 2, the same or similar operations may be applied to the first object 10 and the second object 20 of FIG. 1. Moreover, one or more of the operations of FIG. 6 may be performed by the controller 50 of FIG. 2 or by other elements of FIGS. 1-4 described above.

Referring to FIGS. 2, 4, and 6, in an operation 601, the robot 40 may determine an estimate of the locations of the measurement points 11a, 11b, and 11c. For example, the robot may receive signals receive signals from the measurement points 11a, 11b, and 11c to estimate the locations of the measurement points 11a, 11b, and 11c on the beacon 30. In some embodiments, the signals may include measurement signals that are emitted from the measurement points 11a, 11b, and 11c to receiver unit 20a. In some embodiments, the robot 40 may transmit measurement signals from a transmitter of the receiver unit 20a to the measurement points 11a, 11b, and 11c and the signals received at the robot 40 from the measurement points 11a, 11b, and 11c may include measurements of the measurement signals from the measurement points 11a, 11b, and 11c.

In an operation 602, the robot 40 may determine an estimate of the location of the box 10a based on the estimate of the locations of the measurement points 11a, 11b, and 11c. For example, the measurement points 11a, 11b, and 11c may be on the beacon 30 in a known arrangement with respect to an origin of a local coordinate system of the beacon 30, for example the corner 13. Accordingly, the location of the origin of the local coordinate system of the beacon 30 may be calculated based on the estimate of the locations of the measurement points 11a, 11b, and 11c. Based on the alignment of a reference feature of the beacon 30 with a reference feature of the box 10a, such as an alignment of the corner 13 with the corner 14, the arrangement of the measurement points 11a, 11b, and 11c with respect to the origin of the local coordinate system of the beacon 30, and the estimate of the locations of the measurement points 11a, 11b, and 11c, the location of the box 10a may be calculated.

In an operation 603, the robot 40 may determine a first measurement of an orientation of the box 10a based on the estimate of the locations of the measurement points 11a, 11b, and 11c. For example, the measurement points 11a, 11b, and 11c may be arranged in two dimensions to define a plane. Accordingly, an orientation of the plane may be calculated based on the estimate of the locations of the measurement points 11a, 11b, and 11c. Based on the alignment of the reference feature of the beacon 30 with the reference feature of the box 10a and the orientation of the plane defined by the estimate of the locations of the measurement points 11a, 11b, and 11c, the first measurement of the orientation of the box 10a may be calculated.

In an operation 604, the robot may determine a second measurement of the orientation of the box 10a based on measurements by the orientation sensor 12a. For example, information about the measurements from the orientation sensor 12a may be transmitted to the robot 40 via one or more of the measurement points 11a, 11b, and 11c and/or via another communication interface. In some embodiments, the orientation sensor 12a, the beacon 30, and/or the box 10a may calculate the second measurement of the orientation of the box 10a based on the measurements by the orientation sensor 12a. In some embodiments, the robot 40 may calculate the second measurement of the orientation of the box 10a based on the measurements by the orientation sensor 12a and/or may transform an orientation measurement from a coordinate system of the beacon 30 and/or of the box 10a to a coordinate system of the robot 40 to determine the second measurement of the orientation of the box 10a.

In an operation 605, the robot 40 may determine an accuracy of the estimate of the location of the box 10a. For example, the robot 40 may estimate an error of the estimate of the location of the box 10a based on a difference between the first measurement of the orientation of the box 10a and the second measurement of the orientation of the box 10a. For example, the first measurement of the orientation of the box 10a and the second measurement of the orientation of the box 10a may be compared to determine a difference between the first measurement of the orientation of the box 10a and the second measurement of the orientation of the box 10a. The difference between the first measurement of the orientation of the box 10a and the second measurement of the orientation of the box 10a may indicate an error in the first measurement of the orientation of the box 10a. The error in the first measurement of the orientation of the box 10a may be caused by an error in the estimate of the location of one or more of the measurement points 11a, 11b, and 11c. Because the estimate of the location of the box 10a is also based on the estimate of the location of the measurement points 11a, 11b, and 11c, the error in the estimate of the location of the one or more of the measurement points 11a, 11b, and/or 11c may also cause an error in the estimate of the location of the box 10a. Accordingly, the error of the estimate of the location of the box 10a may be estimated based on the difference between the first measurement of the orientation of the box 10a and the second measurement of the orientation of the box 10a. In other words, an accuracy of the measurement of the orientation of the box 10a may be determined.

In an operation 606, the robot 40 may take an action based on the estimated accuracy of the estimate of the location of the box 10a. For example, the robot 40 may adjust a movement of the robot 40 based on the error of the estimate of the location of the box 10a. In some embodiments, the robot 40 may be moved closer to a target location based on the estimate of the location of the box 10a. The target location may be defined based on the estimate of the location of the box 10a. The robot 40 may be moved closer to the target location when the error of the estimate of the location of the box 10a is less than a predetermined threshold. The target location may be adjusted based on the error of the estimate of the location of the box 10a. In other words, in some embodiments, a robot 40 may be instructed to pick up an object in the box 10a or place an object in the box 10a. The robot 40 may move towards a target location within the box 10a, for example by moving an arm of the robot 40, based on the measurements of the location and/or orientation of the box 10a.

In some embodiments, the adjusting of the movement of the robot 40 may include avoiding a boundary location based on the error of the estimate of the location of the box 10a. The boundary location may be defined based on the estimate of the location of the box 10a. The boundary location may be adjusted based on the error of the estimate of the location of the box 10a. In other words, in some embodiments, the robot 40 may define a boundary location, such as a wall of the box 10a that is to be avoided, based on the measurements of the location and/or orientation of the box 10a. The robot 40 may adjust the boundary location, such as a width of the area to be avoided, based on the error of the estimate of the location of the box 10a. For example, the robot 40 may avoid a wider area if the error is greater in order to ensure that the robot 40 does not accidentally contact the wall of the box 10a.

In some embodiments, the action based on the estimated accuracy of the estimate of the location may include adjusting a setting. For example, a setting of a tool may be adjusted based on an estimated error in the estimate of the location. For example, in some embodiments, a setting such as torque and/or rotation speed may be adjusted for a tool such as a screwdriver based on the estimated accuracy of the estimate of the location. In some embodiments, a setting such as current and/or temperature may be adjusted for a tool such as a welding tool based on the estimated accuracy of the estimate of the location. This may be useful, for example, because a higher current and/or temperature setting may be desired if, based on the estimated accuracy of the estimate of the location, the tool may be at a distance away from an ideal placement.

Figure 7:
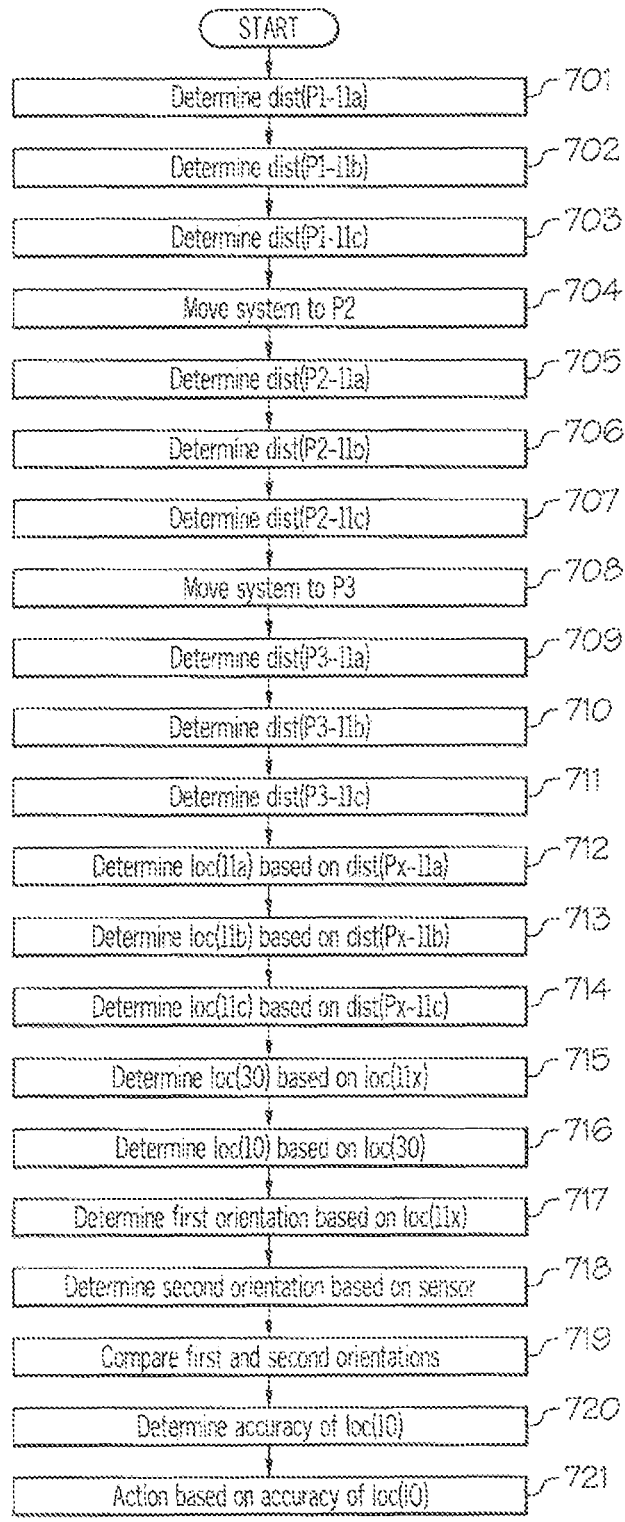
FIG. 7 is a flowchart illustrating operations of methods of estimating the position and/or orientation of an object according to some embodiments of the inventive concepts.

FIG. 7 is a flowchart illustrating operations of methods of estimating the position and/or orientation of an object according to some embodiments of the inventive concepts. Some of the operations of FIG. 6 may be similar to or the same as operations described above with respect to FIG. 6. Accordingly, a detailed description may be omitted for brevity. As with FIG. 6, while the operations of FIG. 7 will be described with reference to the box 10a and the robot 40 of FIG. 2, the same or similar operations may be applied to the first object 10 and the second object 20 of FIG. 1. Moreover, one or more of the operations of FIG. 7 may be performed by the controller 50 of FIG. 2 or by other elements of FIGS. 1-4 described above.

Referring to FIGS. 2, 4, and 7, the robot 40 may begin at a first location P1. For example, the receiver unit 20a of the robot 40 may begin at the first location P1. In an operation 701, the robot 40 may determine a measurement of a distance from the first location P1 to the measurement point 11a. The distance may be measured using a signal received at the receiving unit 20a from the measurement point 11a. In some embodiments, the signal may include an ultrasonic signal, a radio signal, and/or a radar signal. The distance may be measured, for example, using a timing, an amplitude, and/or a phase of the received signal. Accordingly, in an operation 702 and an operation 703, the robot 40 may determine measurements of distances from the first location P1 to the measurement points 11b and 11c, respectively, in a similar manner.

In some embodiments, the signals may include measurement signals that are emitted from the measurement points 11a, 11b, and 11c to receiver unit 20a. In some embodiments, the robot 40 may transmit measurement signals from a transmitter of the receiver unit 20a to the measurement points 11a, 11b, and 11c and the signals received at the robot 40 from the measurement points 11a, 11b, and 11c may include measurements of the measurement signals from the measurement points 11a, 11b, and 11c.

In an operation 704, the robot 40 may move to a second location P2. For example, the robot may move an arm that includes the receiving unit 20a to the second location P2. In an operation 705, an operation, 706, and an operation 707, the robot 40 may determine measurements of distances from the second location P2 to the measurement points 11a, 11b, and 11c, respectively. In an operation 708, the robot 40 may move to another second location P3. In an operation 709, an operation, 710, and an operation 711, the robot 40 may determine measurements of distances from the second location P3 to the measurement points 11a, 11b, and 11c, respectively.

Accordingly, the robot 40 may determine measurements of distances to each of the measurement points 11a, 11b, and 11c, from the first location P1 and from each of the second locations P2 and P3.

In an operation 712, and operation, 713, and an operation 714, the robot 40 may determine measurements of the locations of the measurement points 11a, 11b, and 11c based on the signals received from the measurement, points 11a, 11b, and 11c at each of the locations P1, P2, and P3. For example. the locations of the measurement points 11a, 11b, and 11c may be measured using run-time based distance measurements, triangulation calculations, and/or trilateration calculations.

In an operation 715, the robot 40 may determine an estimate of the location of the beacon 30 based on the estimate of the locations of the measurement points 11a, 11b, and 11c. For example, the measurement points 11a, 11b, and 11c may be on the beacon 30 in a known arrangement with respect to an origin of a local coordinate system of the beacon 30, for example the corner 13. Accordingly, the location of the origin of the local coordinate system of the beacon 30 may be calculated based on the estimate of the locations of the measurement points 11a, 11b, and 11c.

In an operation 716, the robot 40 may determine an estimate of the location of the box 10a based on the estimate of the location of the beacon 30 on the box 10a. For example, based on the alignment of the reference feature of the beacon 30 with the reference feature of the box 10a, such as an alignment of the corner 13 with the corner 14, the arrangement of the measurement points 11a, 11b, and 11c with respect to the origin of the local coordinate system of the beacon 30, and the estimate of the locations of the measurement points 11a, 11b, and 11c, the location of the box 10a may be calculated.

In an operation 717, the robot 40 may determine a first measurement of an orientation of the box 10a based on the estimate of the locations of the measurement points 11a, 11b, and 11c. For example, the measurement points 11a, 11b, and 11c may be arranged in two dimensions to define a plane. Accordingly, an orientation of the plane may be calculated based on the estimate of the locations of the measurement points 11a, 11b, and 11c. Based on the alignment of the reference feature of the beacon 30 with the reference feature of the box 10a and the orientation of the plane defined by the estimate of the locations of the measurement points 11a, 11b, and 11c, the first measurement of the orientation of the box 10a may be calculated.

In an operation 718, the robot may determine a second measurement of the orientation of the box 10a based on measurements by the orientation sensor 12a. For example, information about the measurements from the orientation sensor 12a may be transmitted to the robot 40 via one or more of the measurement points 11a, 11b, and 11c and/or via another communication interface. In some embodiments, the orientation sensor 12a, the beacon 30, and/or the box 10a may calculate the second measurement of the orientation of the box 10a based on the measurements by the orientation sensor 12a. In some embodiments, the robot 40 may calculate the second measurement of the orientation of the box 10a based on the measurements by the orientation sensor 12a and/or may transform an orientation measurement from a coordinate system of the beacon 30 and/or of the box 10a to a coordinate system of the robot 40 to determine the second measurement of the orientation of the box 10a.

In an operation 719, the robot 40 may compare the first measurement of the orientation of the box 10a to the second measurement of the orientation of the box 10a. For example, the first measurement of the orientation of the box 10a and the second measurement of the orientation of the box 10a may be compared to determine a difference between the first measurement of the orientation of the box 10a and the second measurement of the orientation of the box 10a. The difference between the first measurement of the orientation of the box 10a and the second measurement of the orientation of the box 10a may indicate an error in the first measurement of the orientation of the box 10a. The error in the first measurement of the orientation of the box 10a may be caused by an error in the estimate of the location of one or more of the measurement points 11a, 11b, and 11c.

In an operation 720, the robot 40 may determine an accuracy of the estimate of the location of the box 10a. For example, the robot 40 may estimate an error of the estimate of the location of the box 10a based on the difference between the first measurement of the orientation of the box 10a and the second measurement of the orientation of the box 10a. Because the estimate of the location of the box 10a is also based on the estimate of the location of the measurement points 11a, 11b, and 11c, the error in the estimate of the location of the one or more of the measurement points 11a, 11b, and/or 11c may also cause an error in the estimate of the location of the box 10a. Accordingly, the error of the estimate of the location of the box 10a may be estimated based on the difference between the first measurement of the orientation of the box 10a and the second measurement of the orientation of the box 10a. In other words, an accuracy of the measurement of the orientation of the box 10a may be determined.

In an operation 721, the robot 40 may take an action based on the estimated accuracy of the estimate of the location of the box 10a. For example, the robot 40 may adjust a movement of the robot 40 based on the error of the estimate of the location of the box 10a. In some embodiments, the robot 40 may be moved closer to a target location based on the estimate of the location of the box 10a. The target location may be defined based on the estimate of the location of the box 10a. The robot 40 may be moved closer to the target location when the error of the estimate of the location of the box 10a is less than a predetermined threshold. The target location may be adjusted based on the error of the estimate of the location of the box 10a. In other words, in some embodiments, a robot 40 may be instructed to pick up an object in the box 10a or place an object in the box 10a. The robot 40 may move towards a target location within the box 10a, for example by moving an arm of the robot 40, based on the measurements of the location and/or orientation of the box 10a.

In some embodiments, the adjusting of the movement of the robot 40 may include avoiding a boundary location based on the error of the estimate of the location of the box 10a. The boundary location may be defined based on the estimate of the location of the box 10a. The boundary location may be adjusted based on the error of the estimate of the location of the box 10a. In other words, in some embodiments, the robot 40 may define a boundary location, such as a wall of the box 10a that is to be avoided, based on the measurements of the location and/or orientation of the box 10a. The robot 40 may adjust the boundary location, such as a width of the area to be avoided, based on the error of the estimate of the location of the box 10a. For example, the robot 40 may avoid a wider area if the error is greater in order to ensure that the robot 40 does not accidentally contact the wall of the box 10a.

In some embodiments, the action based on the estimated accuracy of the estimate of the location may include adjusting a setting. For example, a setting of a tool may be adjusted based on an estimated error in the estimate of the location. For example, in some embodiments, a setting such as torque and/or rotation speed may be adjusted for a tool such as a screwdriver based on the estimated accuracy of the estimate of the location. In some embodiments, a setting such as current and/or temperature may be adjusted for a tool such as a welding tool based on the estimated accuracy of the estimate of the location. This may be useful, for example, because a higher current and/or temperature setting may be desired if, based on the estimated accuracy of the estimate of the location, the tool may be at a distance away from an ideal placement.

Figure 8:
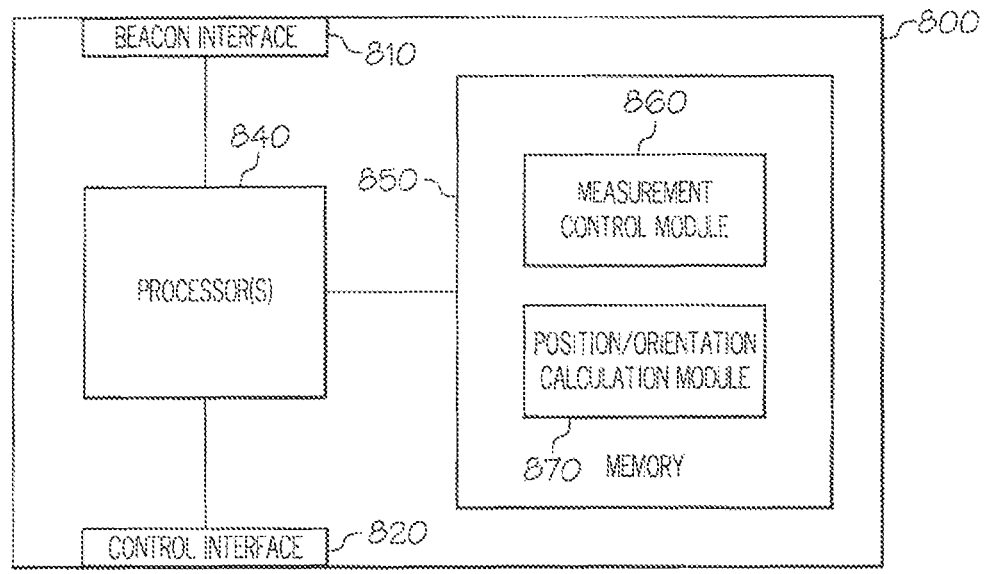
FIG. 8 is a block diagram schematically illustrating a system for estimating the position and/or orientation of an object according to some embodiments of the inventive concepts.

FIG. 8 is a block diagram schematically illustrating a system for estimating the position and/or orientation of an object according to some embodiments of the inventive concepts. Referring to FIG. 8, a receiver 800 may be utilized for implementing the above concepts. For example, the receiver 800 may be the interface 21 of FIG. 1 and/or the receiver unit 20a of FIG. 2.

The receiver 800 may include a beacon interface 810. The beacon interface 810 may be configured to receive signals from one or more beacons, such as the beacon 30 of FIG. 2. The beacon interface 810 may support reception of ultrasonic signals, radio signals, and/or of radar signals. In some embodiments, the beacon interface 810 may support directional reception of the signals, e.g., based on a multi-antenna technology or multi-receiver technology. In some embodiments, the beacon interface 810 may support bidirectional transmission. In such embodiments, the beacon interface 810 may be used for sending instructions or other control information to the beacon(s), such as instructions to start or stop sending signals.

In some embodiments, the receiver 800 may include a control interface 820. The control interface 820 may connect the receiver 800 to an external controller, such as the controller 50 of FIG. 2. The control interface 820 may connect the receiver 800 to a robot, such as the robot 40 of FIG. 2. The control interface 820 may include a wireless interface, e.g., a radio interface, or a wire-based interface. The control interface 820 may provide the receiver 800 with information concerning the arrangement of the measurement points 11a, 11b, and 11c of the beacon 30 in relation to a reference feature of the beacon 30 and/or with information concerning the geometry of an object of which the position and orientation is to be determined.

The receiver 800 may include a control unit, such as one or more processors 840 and a memory 850 that is coupled to the processor. The beacon interface 810 and the memory 850 may be coupled to the processor(s) 840, e.g., using one or more internal bus systems of the receiver 800. The memory 850 may include a non-volatile memory device.

The memory 850 may include a measurement control module 860 and/or a position/orientation calculation module 870. The program code modules 860 and 870 may include program code that is configured to be executed by the processor(s) 840.

The measurement control module 860 may implement functionalities of controlling the above-mentioned functionalities of performing measurements on the basis of signals received from one or more measurement points of the beacon 30. The position/orientation calculation 870 may implement the above-described functionalities of calculating the position and/or orientation of the object on which the beacon is placed and aligned.

The receiver 800 may also include other elements, e.g., structures or program code modules for implementing functionalities of an ultrasonic, radio, or radar receiver.

Figure 9:
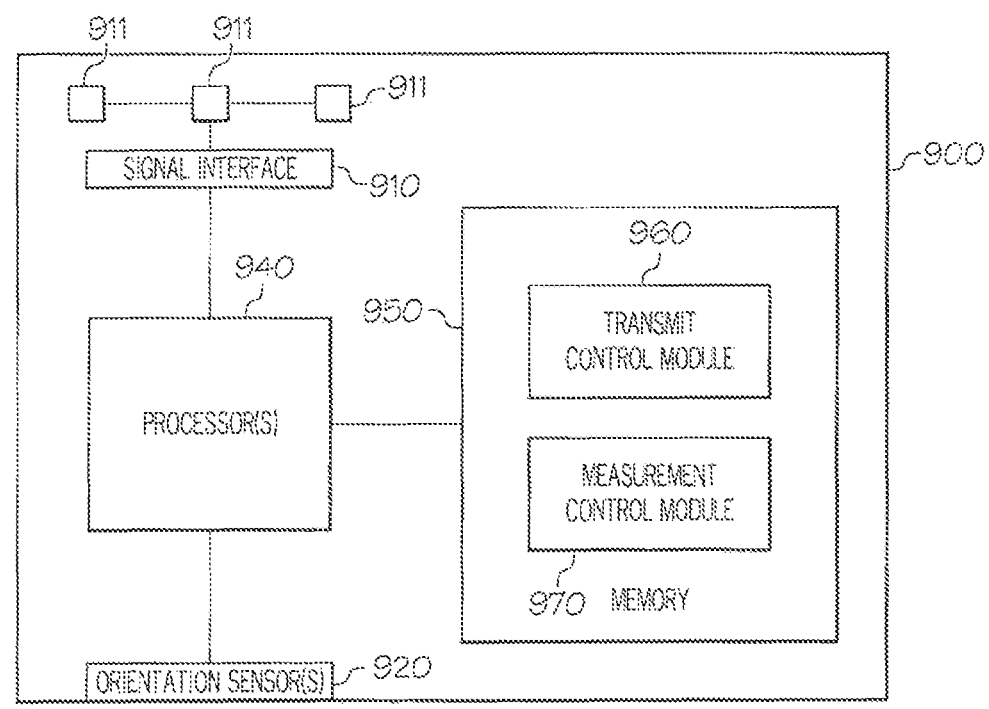
FIG. 9 is a block diagram schematically illustrating a device for estimating the position and/or orientation of an object according to some embodiments of the inventive concepts.

FIG. 9 is a block diagram schematically illustrating a device for estimating the position and/or orientation of an object according to some embodiments of the inventive concepts. Referring to FIG. 9, a beacon 900 may be utilized for implementing the above concepts. For example, the beacon 900 may be the first object 10 of FIG. 1 and/or the beacon 30 of FIG. 2.

The beacon 900 may include a signal interface 910. The signal interface 910 may be configured to send signals to a receiver, such as the receiver unit 20a of FIG. 2. The signal interface 910 may support sending of ultrasonic signals, of radio signals, and/or of radar signals. In some embodiments, the signal interface 910 may support bidirectional transmission. In such embodiments, the signal interface 910 may receive instructions or other control information, such as the above-mentioned instructions to start or stop sending signals. The beacon 900 may include a plurality of measurement points 911 that are coupled to the signal interface. For example, the plurality of measurement points 911 may include a plurality of antennae that are on a surface of the beacon 900.

The beacon may include an orientation sensor 920. The orientation sensor may, for example, be based on an accelerometer and/or on a gyroscope. The orientation sensor may be an inertial measurement unit.

The beacon 900 may include with one or more processors 940 and a memory 950 that is coupled to the processor. The signal interface 910, the memory 950, and/or the orientation sensor 920 may be coupled to the processor(s) 940, e.g., using one or more internal bus systems of the beacon 900. The memory 950 may include a non-volatile memory device.

The memory 950 may include a transmit control module 960 and/or a measurement control module 970. The program code modules 960 and 970 may include program code that is configured to be executed by the processor(s) 940.

The transmit control module 960 may implement the above described functionalities for sending the signals to the receiver unit 20a on the robot 40. The measurement control module 970 may implement functionalities for performing measurements locally at the beacon 30 itself, e.g., using the orientation sensor 920.

The beacon 900 may also include other elements, e.g., structures or program code modules for implementing functionalities of an ultrasonic and/or radio transmitter.

Further, it is noted that similar structures as shown in FIGS. 6 and 9 could also be used in a scenario where the measurements are based on signals received by the device which is placed on the object. In this case, the beacon interface 610 could be used for sending the signals, and the signal interface 910 could be used for receiving the signals. Further, the signal interface 910 could be used for reporting measurements on the signals to some other device. Moreover, the memory 650 could include a transmit control module for implementing the functionalities for transmitting the signals. Further, the memory 950 could include a reception control module to implement the functionalities for receiving the signals, and the measurement control module 970 could then may implement functionalities for performing measurements on the received signals.

Figure 10:
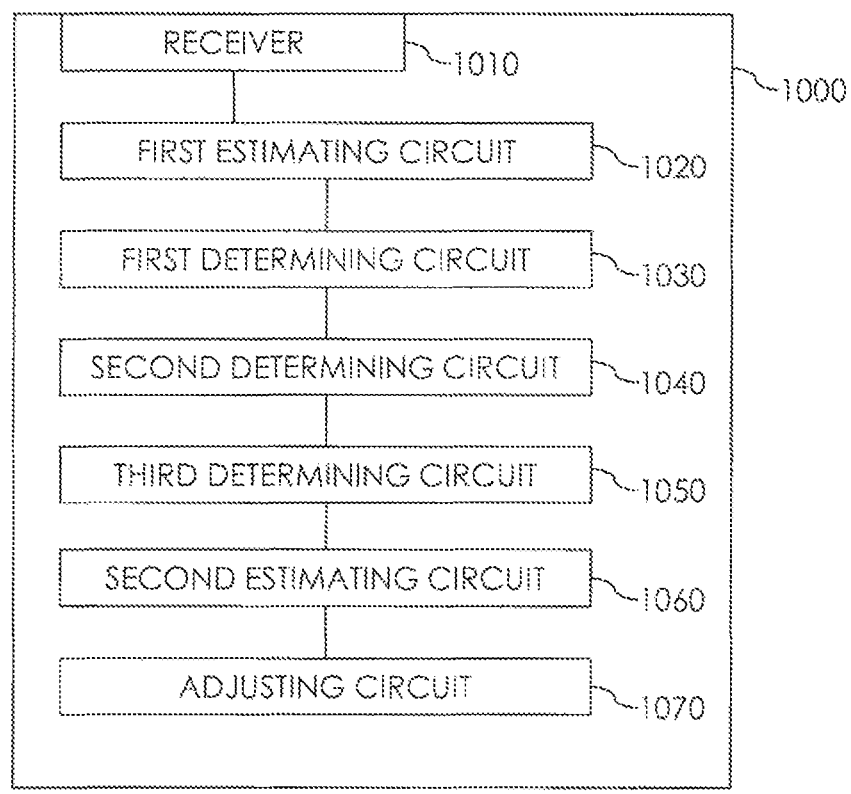
FIG. 10 is a block diagram schematically illustrating a system for estimating the position and/or orientation of an object according to some embodiments of the inventive concepts.

FIG. 10 is a block diagram schematically illustrating a system for estimating the position and/or orientation of an object according to some embodiments of the inventive concepts. Referring to FIG. 10, a system 1000 may be utilized for implementing the above concepts. For example, the system 1000 may be the second object 20 of FIG. 1 and/or the robot 40 of FIG. 2.

The system 1000 may include a receiver 1010 configured to receive signals from one or more objects. For example, the receiver 1010 may be configured to receive signals from a beacon, such as the beacon 30 of FIG. 2. The receiver 1010 may be configured to receive the signals from a plurality of measurement points on an object. For example, the receiver 1010 may be configured to receive the signals from the measurement points 11a, 11b, and 11c of the beacon 30 of FIG. 3. The receiver 1010 may support reception of ultrasonic signals, radio signals, and/or of radar signals. In some embodiments, the receiver 1010 may support directional reception of the signals, e.g., based on a multi-antenna technology or multi-receiver technology. In some embodiments, the receiver 1010 may support bidirectional transmission. In such embodiments, the receiver 1010 may be used for sending instructions or other control information to the beacon(s), such as instructions to start or stop sending signals.

The system 1000 may include a first estimating circuit 1020 configured to estimate locations of the plurality of measurement points on the object based on the signals received by the receiver 1010 from the plurality of measurement points on the object. For example, the first estimating circuit 1020 may perform the operation 601 of FIG. 6 and/or one or more of the operations 701 to 714 of FIG. 7.

The system 1000 may include a first determining circuit 1030 configured to determine an estimate of a location of the object based on the estimating of the locations of the plurality of measurement points on the object. For example, the first determining circuit 1030 may perform the operation 602 of FIG. 6 and/or one or more of the operations 715 to 716 of FIG. 7.

The system 1000 may include a second determining circuit 1040 configured to determine a first measurement of an orientation of the object based on the estimating of the locations of the plurality of measurement points on the object. For example, the second determining circuit 1040 may perform the operation 603 of FIG. 6 and/or the operation 717 of FIG. 7.

The system 1000 may include a third determining circuit 1050 configured to determine a second measurement of the orientation of the object based on measurements by an orientation sensor on the object. For example, the third determining circuit 1050 For example, the third determining circuit 1050 may perform the operation 604 of FIG. 6 and/or the operation 718 of FIG. 7.

The system 1000 may include a second estimating circuit 1060 configured to estimate an error of the estimate of the location of the object based on a difference between the first measurement of the orientation of the object and the second measurement of the orientation of the object. For example, the second estimating circuit 1060 may perform the operation 605 of FIG. 6 and/or one or more of the operations 719 to 720 of FIG. 7.

The system 1000 may include an adjusting circuit 1070. In some embodiments, the adjusting circuit 1070 may be configured to adjust a movement of the system 1000 based on the error of the estimate of the location of the object. In some embodiments, the adjusting circuit 1070 may be configured to adjust a setting, for example a setting of a tool. For example, the adjusting circuit 1070 may perform the operation 606 of FIG. 6 and/or the operation 721 of FIG. 7.

In some embodiments, one or more of the first estimating circuit 1020, the first determining circuit 1030, the second determining circuit 1040, the third determining circuit 1050, the second estimating circuit 1060 and the adjusting circuit 1070 may be implemented in hardware, software, or any combination thereof. For example, one or more of the circuits may include one or more processors and a non-volatile memory coupled to the processor, such as the processors 840 and the memory 850 of FIG. 8. The non-volatile memory may include computer readable program code that, when executed by the processor, causes the processor to perform the described operations of the one or more of the circuits.

Embodiments of the inventive concepts may provide determination of the position and/or orientation of an object using a single device placed on the object. Moreover, embodiments of the inventive concepts may provide improved methods of determining the position and/or orientation of an object by providing an estimate of an error of the estimate of the location of the object. Some embodiments of the inventive concepts may reduce mishandling and/or damage of an object by, for example, a robot. Some embodiments of the inventive concepts may provide compensation of measurement errors based on location measurements in conjunction with orientation measurements. Compensation of measurement errors based on location measurements and orientation measures may substantially improve the determination of the position and/or orientation of an object and thus may improve performance of operations by, for example, a robot.

It is to be understood that the embodiments described above may be modified without departing from the inventive concepts. For example, the inventive concepts may be applied in connection with various kinds of robotic systems and also in applications not related to robotics, such as tracking of an object or virtual reality applications. Further, the inventive concepts may utilize various types of beacons and receivers.

What is claimed is:

1. A method of determining a location of a first object, the method comprising:
  receiving signals at a second object from a plurality of measurement points on the first object;
  estimating locations of the plurality of measurement points on the first object based on the signals received at the second object from the plurality of measurement points on the first object;
  determining an estimate of a location of the first object based on the estimating of the locations of the plurality of measurement points on the first object;
  determining a first measurement of an orientation of the first object based on the estimating of the locations of the plurality of measurement points on the first object;
  determining a second measurement of the orientation of the first object based on measurements by an orientation sensor on the first object;
  estimating an error of the estimate of the location of the first object based on a difference between the first measurement of the orientation of the first object and the second measurement of the orientation of the first object; and
  adjusting a movement based on the error of the estimate of the location of the first object.

2. The method of claim 1,
  wherein the signals are emitted from the plurality of measurement points on the first object to the second object, and
  wherein the estimating of the locations of the plurality of measurement points is based on a timing, an amplitude, and/or a phase of the signals received at the second object from the plurality of measurement points on the first object.

3. The method of claim 1, further comprising:
  transmitting measurement signals from the second object to the plurality of measurement points on the first object,
  wherein the signals received at the second object from the plurality of measurement points on the first object comprise measurements of the measurement signals transmitted from the second object to the plurality of measurement points on the first object.

4. The method of claim 1,
  wherein the signals received at the second object from the plurality of measurement points on the first object comprise at least one of ultrasonic signals, radio signals, and radar signals.

5. The method of claim 1,
  wherein the signals received at the second object from the plurality of measurement points on the first object comprise first signals received at a first location of the second object from the plurality of measurement points on the first object and at least second signals received at an at least one second location of the second object from the plurality of measurement points on the first object.

6. The method of claim 5, further comprising:
  moving the second object between the first location and the at least one second location in a time period that is between a time of receiving the first signals and a time of receiving the at least second signals.

7. The method of claim 1,
  wherein the estimating the locations of the plurality of measurement points on the first object comprises:
    determining measurements of distances to each of the plurality of measurement points on the first object from a first location of the second object and from at least one second location of the second object; and
    estimating the locations of the plurality of measurement points on the first object based on the measurements of the distances, and wherein the estimating the error of the estimate of the location of the first object comprises:
estimating an error of the measurements of the distances based on a difference between the first measurement of the orientation of the first object and the second measurement of the orientation of the first object; and
estimating the error of the estimate of the location of the first object based on the error of the measurements of the distances.

8. The method of claim 7,
wherein a distance between adjacent ones of the plurality of measurement points on the first object is greater than an accuracy of distance measurements of a technology used for the measurements of the distances.

9. The method of claim 1,
wherein the plurality of measurement points on the first object comprises at least three measurement points on the first object that are arranged in two dimensions to define a plane.

10. The method of claim 1, further comprising:
aligning a reference feature of the first object with a reference feature of a device on the first object,
wherein the device comprises the plurality of measurement points on the first object and the orientation sensor on the first object,
wherein determining the location of the first object is based on an arrangement of the plurality of measurement points in relation to the reference feature of the device, and
wherein determining the first measurement of the orientation of the first object is based on an arrangement of the plurality of measurement points in relation to the reference feature of the device.

11. The method of claim 10,
wherein determining the second measurement of the orientation of the first object is based on an arrangement of the orientation sensor in relation to the reference feature of the device.

12. The method of claim 1, further comprising:
determining that the estimate of the location of the first object is invalid based on the error of the estimate of the location of the first object being greater than a predetermined threshold.

13. The method of claim 1,
wherein the adjusting of the movement comprises moving the second object closer to a target location based on the estimate of the location of the first object.

14. The method of claim 13, further comprising:
defining the target location based on the estimate of the location of the first object.

15. The method of claim 1, further comprising:
defining a boundary location associated with the first object based on the estimate of the location of the first object,
wherein the adjusting of the movement comprises avoiding the boundary location.

16. The method of claim 1, further comprising:
adjusting the estimate of the location of the first object based on the difference between the first measurement of the orientation of the first object and the second measurement of the orientation of the first object.

17. A system comprising:
a receiver configured to receive signals from a plurality of measurement points on an object; and
a control unit configured to:
estimate locations of the plurality of measurement points on the object based on the signals received by the receiver from the plurality of measurement points on the object;
determine an estimate of a location of the object based on the estimated locations of the plurality of measurement points on the object;
determine a first measurement of an orientation of the object based on the estimated locations of the plurality of measurement points on the object;
determine a second measurement of the orientation of the object based on measurements by an orientation sensor on the object;
estimate an error of the estimate of the location of the object based on a difference between the first measurement of the orientation of the object and the second measurement of the orientation of the object; and
adjust a movement of the system based on the error of the estimate of the location of the object.

18. The system of claim 17,
wherein the signals comprise measurement signals that are emitted from the plurality of measurement points on the object to the system.

19. The system of claim 17, wherein the control unit is further configured to:
transmit measurement signals from the system to the plurality of measurement points on the object,
wherein the signals received at the system from the plurality of measurement points on the object comprise measurements of the measurement signals transmitted from the system to the plurality of measurement points on the object.

20. A device comprising: at least three measurement points arranged on a surface of the device in two dimensions to define a plane; an orientation sensor; and a processor configured to: transmit a plurality of signals via the at least three measurement points to an object; receive measurements from the orientation sensor; and transmit the measurements to the object, wherein the object is configured to: estimate locations of the at least three measurement points on the surface of the device based on the signals; determine an estimate of a location of the device based on the estimated locations; determine a first measurement of an orientation of the device based on the estimated locations; determine a second measurement of the orientation of the device based on the measurements; estimate an error of the estimate of the location of the device based on a difference between the first measurement and the second measurement; and adjust a movement based on the error of the estimate of the location of the device.

* * * * *